Patented Apr. 22, 1941

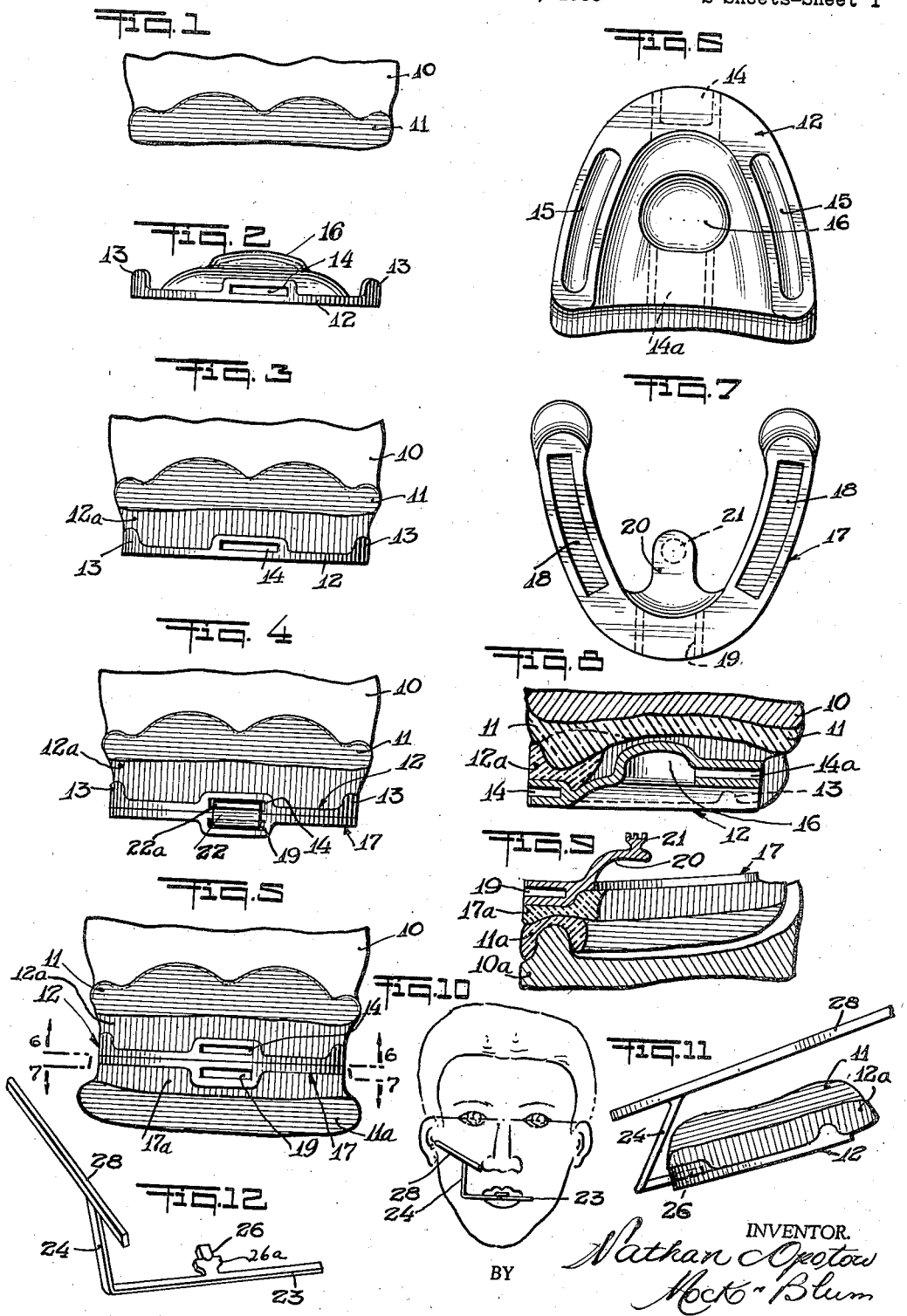

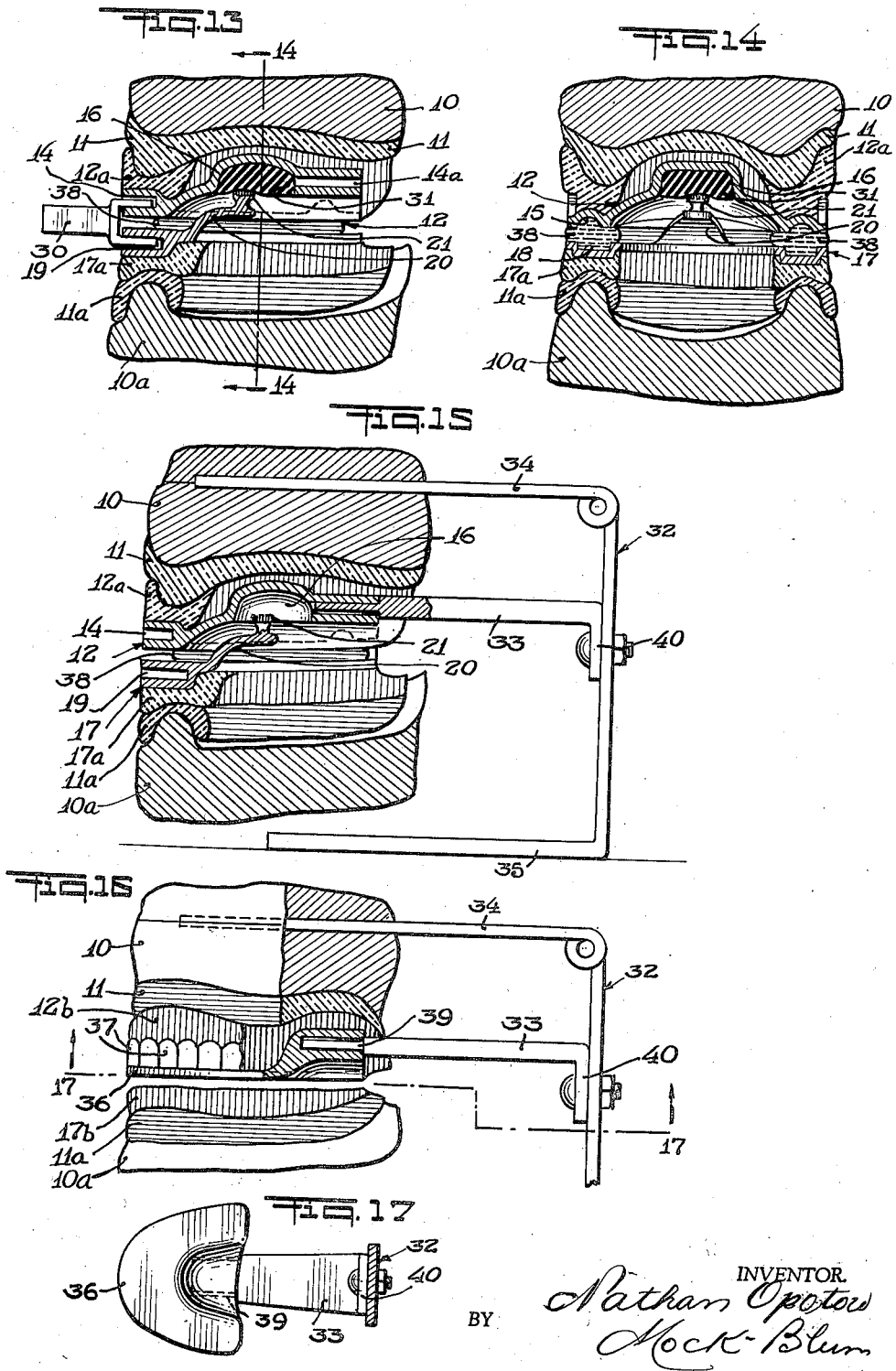

2,239,294

UNITED STATES PATENT OFFICE 2,239,294

DENTAL APPARATUS

Nathan Opotow, New York, N. Y.

Application January 15, 1938, Serial No. 185,081

7 Claims. (Cl. 32—19)

My invention relates to dental plates and more particularly to a method and apparatus for securing a correct bite between the component parts of the denture.

In the construction of these dental plates, the fundamental steps are:

a. Taking an impression of the mouth in suitable plastic material, generally plaster-of-Paris.

b. Forming a model from the impressions, this being a positive reproduction of the patient's mouth.

c. Forming a base plate on the model.

d. Securing a wax block to the base plate in order to establish the relationship of the jaws, including the bite and the proper distance between the jaws, etc., and e. Transferring the resulting model of the mouth to an articulator and thereafter setting teeth in said model.

It has been generally recognized in the art that step d has been most difficult of achievement and various technics for establishing centric and other functional relationships have been devised.

In addition, before the correct bite can be established, it is essential that proper plates be formed, and it is well known in the art that these plates, particularly the upper plate, are usually positioned in the mouth according to definite laws of anatomy. Specifically, it has been found that the horizontal position of the occlusal plane, when seen from the front, should be parallel to a line through the pupils of the eyes. Similarly, the antero-posterior level of the occlusal plane is substantially parallel to a line from the center of the ear to the lowest part of the wing of the nose. These relationships are generally measured by individual methods, usually an ordinary ruler or merely haphazard appraisal by the dentist.

Bearing the foregoing in mind, it is the principal object of my invention to provide a method and apparatus for establishing the correct relationship of the jaws in the normal bite of a particular person.

Another object of my invention is to provide apparatus for registering the relationship of the jaws when a normal bite is effected and to provide means for retaining said registration.

Another object of my invention is to provide means for measuring the occlusal plane as heretofore described.

Another object of my invention is to combine means for measuring the occlusal plane with means for determining the height of the teeth in the mouth, so that the denture will be aesthetically unobjectionable.

Another object of my invention is to provide a plate which may be adjusted so as to represent the occlusal plane and which when held in an ordinary dental articulator may afford a base on which the artificial teeth may be set. It is obvious therefore that the biting edges of the teeth will be properly in the occlusal plane when they are separated from the said plate.

Other objects of my invention will be set forth in the following description, it being understood that the above general statement of the objects of my invention are intended to explain, and not to limit, it in any manner.

In the drawings,

Fig. 1 is a front view of the upper base plate and jaw.

Fig. 2 is a front view of the upper bite plate.

Fig. 3 is a front view illustrating the connection between the upper base plate and the upper bite plate.

Fig. 4 is a front view illustrating the connection between the upper base plate, the upper bite plate and the lower bite plate, said component parts being shown locked to prevent relative movement.

Fig. 5 shows the complete structure, the lock having been removed.

Fig. 6 is a section through the line 6—6 of Fig. 5, slightly in perspective and illustrating the formation of the upper bite plate.

Fig. 7 is a section through the line 7—7 of Fig. 5, slightly in perspective, and illustrating the formation of the lower bite plate.

Fig. 8 is a longitudinal section through the upper jaw structure.

Fig. 9 is a longitudinal section through the lower jaw structure.

Fig. 10 is a diagrammatic view illustrating the occlusal plane measuring means as utilized with my structure.

Fig. 11 is a side elevation illustrating further the function of the structure shown in Fig. 10.

Fig. 12 is a perspective view of the occlusal plane measuring means shown in Fig. 10.

Fig. 13 is a longitudinal section of the composite structure prior to its transfer from the mouth of the patient to a dental articulator.

Fig. 14 is a section along the line 14—14 of Fig. 13.

Fig. 15 is a view of the composite structure having been transferred to a dental articulator.

Fig. 16 is a similar view showing the insertion of the occlusal plate and the setting of teeth thereupon.

Fig. 17 is a top view of the occlusal plate as it is held in the articulator.

Referring to the drawings, 10 represents the upper cast or actual gum and 11 represents the upper base plate which has been formed on the upper cast 10. The upper bite plate 12 is formed with lugs 13 and with a raised front central portion having a slot 14 formed therein. The plate 12 is further provided with depressions 15 which are formed with rounded edges for a purpose to be hereinafter described. The plate 12 is further provided with a deep recess 16, as clearly shown in Fig. 8. A slot 14a is formed in the rear end of the plate 12. The lower bite plate 17 is provided with depressions 18 on its upper surface and these depressions 18 are formed with sharp edges and corners. The plate 17 has a slot 19 formed therein and has an arched stem 20 bearing a knurled head 21. This head 21 is located in the recess 16 when the plate 17 abuts the plate 12 as shown in Fig. 4. The plate 17 is secured in any suitable manner, preferably by a mass of wax 17a, to a base plate 11a, and this base plate 11a is fitted to a lower cast 10a as shown in Fig. 9. In order that these plates be firmly connected, a bifurcated member 22 is provided and it enters the slots 14 and 19. Said bifurcated member 22 is formed with a ledge 22a adjoining the upper leg. The plates may be made of any metal, such as aluminum or any suitable plastic material. The plate 12 is similarly secured preferably by wax 12a to the base plate 11. As seen in Fig. 3, the lugs 13 do not contact the base plate but remain embedded in the wax 12a.

In order to facilitate the measurement of the occlusal plane, a bar 23 is provided having an end member 24 and a central member 26. The member 24 is integrally connected to an arm 28. Referring to Fig. 13, the plates aforementioned have been inserted in the patient's mouth and a bifurcated lock member 30 retains the plates in spaced relation. As shown, a resilient pad 31 is disposed in the recess 16 and abuts the knurled head 21. The space between the plates is shown partially filled with plaster 38, preferably an ordinary plaster-of-Paris composition.

A dental articulator 32 of any standard construction is then employed to retain the plates in the same relative position as they enjoyed in the mouth of the patient. In this articulator 32 I provide for removably engaging an arm 33, preferably to the central portion of the articulator and this arm 33 has a reduced end portion adapted to fit in the slot 14a of the upper plate 13. The arms 34 and 35 of the articulator 32 are secured to the upper and lower positive models in a manner that is standard in the art, namely, by plaster.

Referring to Fig. 16, the upper and lower bite plates 12 and 17 have been removed from the articulator and said articulator now holds the upper positive model 10, the upper base plate 11 secured thereto as aforesaid, a plate 36 which I shall hereafter call the occlusal template, and teeth 37 which are positioned so as to rest on the occlusal template 36.

The invention is practiced in the following manner:

After the upper positive model 10 has been formed, the upper base plate 11 is molded thereon and allowed to set. The upper bite plate 12 is then loosely secured to said base plate 11 by means of warm and therefore soft wax 12a, and the combination is set in the mouth of the patient. At this point the bar 23 is inserted in the slot 14 by means of the central member 26. If the plate 12 is correctly positioned in the mouth, the bar 23 will be parallel with an imaginary line drawn through the pupils of the eyes. In addition, the arm 28 will have its opposite ends pointing respectively to the lowest part of the wing of the nose, and to the center of the ear, or the arm 28 will be parallel to an imaginary line pointing as aforesaid. However, in all probability, the upper plate must be manually adjusted before this result is obtained. It should be noted that the operation just described is accomplished in but a short time and the wax 12a has not yet hardened. It is therefore most simple to manually move and adjust the plate 12 in the soft wax 12a until the bar 23 and the arm 28 indicate that the occlusal plane has been established. The wax is thereafter permitted to harden.

It will be noted that the central member 26 is provided with a ledge 26a. When the bar 23 is inserted in the slot 14 of the plate 12, the ledge 26a is on a slightly higher plane than the plate 12, and this ledge 26a provides a guide against which the upper lip may rest. Thus, inasmuch as the biting edges of the teeth should be slightly below the end of the lip, the ledge 26a insures that the plate 12 is further positioned so that the teeth will be similarly in correct position. The bar 23 is thereafter removed.

The lower bite plate 17 is then connected to the upper plate 12 by means of the bifurcated member 22. The lower base plate 11a has been molded on a positive model 10a just as the plate 11. This lower base plate 11a is set in the patient's mouth and a roll of soft wax 17a is placed upon it. The patient is then told to close his mouth, and the plate 17 contacts the wax 17a. The lips of the patient should not meet normally at this point, because thereafter a layer of plaster 38, as will be hereinafter described, will be interposed between the bite plates. Therefore I provide a ledge 22a on the member 22 against which the top of the lower lip will abut at a position slightly higher than normal to compensate for the layer of plaster 38 which will operate to separate the upper and lower bite plate slightly, so that the lower lip will normally meet the upper lip. When the dentist observes that the plate 17 has descended into the wax to the correct level, as described, the wax is permitted to harden and the combination is complete, whereupon the member 22 is removed.

The next step is to establish the bite, or the working relation of the jaws. A resilient pad 31 which may be of rubber, felt or similar material is placed in the recess 16 and this pad 31 is preferably, but not necessarily, provided with a rough outer surface.

The base plates 11 and 11a, together with the bite plates 12 and 17, to which they are secured by wax, being disposed in the patient's mouth, a mass of soft plaster 38 is applied over the depressions 18 of the plate 17. It is now essential to obtain the correct relation of the jaws to each other and various and diverse methods are employed by dentists. I have discovered that when a person simulates the act of laughing, his jaws assume the correct relationship, which fact will be apparent to those skilled in the art. That is, the condyle heads of the lower jaw are in their rest position in the floors of the mandibular fossae, a retrusive position from which functional movements can be made with comfort. The patient is then instructed to simulate the act of laughing and thereafter told to close his mouth. Ordinarily when this is done, the patient has the tendency to clutch or grab, thus disturbing the correct relationship heretofore established, but my construction obviates this difficulty. As the mouth of the patient begins to close, the knurled head 21 of the stem 20 contacts the resilient pad 31 which is preferably formed with a rough outer surface, as previously described. Thus, the head 21 will firmly anchor the plate 17 and the head 21 will not skid during the biting process. The term "anchor" is not meant to imply a total absence of possible movement since obviously the resilient pad 31 will permit the head 21 to move longitudinally as well as diagonally by compressing said resilient pad. However, the head 21 cannot skid or move relatively to the surface which it abuts. In the meantime, the plaster 38 will enter the depressions 15 of the bite plate 12 and will harden in the shape of said depressions 15 and 18. The plates 12 and 17 should be maintained spaced from each other, so that variations in the distance between the different parts of the plates in respect to one another can be registered in the plaster 38 when a bite under pressure is effected. It is apparent that the contours of the plates when these plates are drawn together, will cause the upper plate 12 to become embedded in the yielding plaster 38 in varying degrees. The bifurcated lock member 30 is utilized for the purpose of maintaining the plates spaced from each other in a definite spaced relationship while relieving the patient of the strain and uncertainty of attempting to thus maintain them. The plaster 38 soon hardens and the lock member 30 is removed. Thereafter the apparatus is removed from the patient's mouth and transferred to an articulator 32, the resilient pad 31 having been removed from the recess 16. It will be observed that the depressions 15, having rounded edges, will not retain the hardened plaster 38 so that the component parts of the apparatus may be easily separated. However, the depressions 18, conversely, will retain the plaster mass 38 due to its angular formation which provides anchorage means. When the parts are removed from the patient's mouth, they may always thereafter be joined to assume the same relationship, since said relationship has been registered by means of the hardened plaster 38. The reduced end of the arm 33 is then inserted in the slot 14a of the plate 12.

As shown in Fig. 15, and as previously explained, the base plates, positive models, bite plates and arm 33 are then secured to the articulator by means of plaster as well known in the art. The arm 33 is preferably adjustably secured to the central portion of the articulator 32 by an adjustable screw 40. We therefore now have in the articulator the exact reproduction of the plates as they were positioned in the patient's mouth. Moreover, the position of the arm 33 in the articulator is wholly dependent on the position of the plates, since the slot 14a controls the position of said arm 33. Thereafter the upper and lower bite plates and base plates are removed and the arm 33, together with the upper and lower positive models 10 and 10a, are alone retained in the articulator. Another upper base plate is molded on the upper positive model 10 and the occlusal template 36 which has a slot 39 formed therein is held in the articulator by the reduced end of the arm 33 which enters said slot 39 as clearly shown in Fig. 16. Thus the occlusal template 36 occupies the same position as formerly occupied by the plate 12. Since the plate 12 represented the biting edges of the upper teeth, the occlusal template now serves the same function. Therefore it is now possible to set the teeth 37, so that their biting edges rest on the occlusal template 36 and they are secured to the second formed upper base plate by wax 12b or otherwise. Once the upper teeth have been correctly set around the outer periphery of the occlusal template 36 and have been retained in the wax, the occlusal template 36 may be removed and it is only a matter of setting the lower teeth to occlude with and to conform to the upper teeth, and these lower teeth may be set in wax 17b.

It is apparent that when the dentures are thus constructed, they will faithfully follow the individual features of each patient's jaws and that the bite of the dentures will be the true relationship, if such relationship has been correctly established. It is further apparent that the relationship can be accurately registered by means of the knurled head 21 and the resilient pad 31 which are effective in maintaining the correct relationship of the jaw plates after such position has been established.

I have shown a preferred embodiment of my invention, but it is obvious that numerous changes and omissions may be made without departing from its spirit.

I claim:

1. A dental apparatus for use in making dentures comprising upper and lower plates, resilient means on one of said plates, means on the other of said plates to anchor said other plate in respect to said first-named plate by engaging said resilient means when the plates are caused to approach each other and means to record the relative position of said plates to each other when said other plate is thus anchored, said recording means comprising an uneven surface on said plates adapted to form corresponding surface marks on a plastic substance to be interposed between said plates before said other plate is anchored.

2. A dental apparatus for the determination of the bite comprising a lower jaw member, an upper jaw member, a projection on one of said members and means to anchor said projection against the other of said members, said means comprising a yielding material having sufficient surface tension to resist its penetration by said projection when said projection is thus anchored.

3. A dental apparatus for the determination of the bite comprising an upper plate, a lower plate, a spacer, said spacer being adapted to maintain said plates in a definite spaced relationship and means to anchor said plates in respect to each other, said means comprising a resilient member on one of said plates and a rigid arm on the other of said plates adapted to engage said resilient member while the plates are maintained spaced by said spacer.

4. A dental apparatus for the determination of the bite comprising an upper plate, a lower plate, a spacer for maintaining said plates in a definite spaced relationship, said spacer comprising a bifurcated member of which each leg engages one of said plates and means to anchor said plates in respect to each other.

5. A dental apparatus for the determination of the bite comprising a first plate, a pad of yieldable material supported by said first plate, a second plate and means to anchor said second plate in respect to said first plate, said means comprising a rigid member connected to said second plate and adapted to engage said pad by embedding itself therein.

6. A dental apparatus according to claim 5 wherein said pad is a block of resilient rubber.

7. A dental apparatus for the determination of the bite comprising a first plate, a resilient pad supported by said first plate, a second plate and means to anchor said second plate in respect to said first plate, said means comprising a rigid member connected to said second plate and adapted to anchor said second plate by depressing said resilient pad.

NATHAN OPOTOW.